United States Patent [19]

Tanaka

[11] 3,992,563

[45] Nov. 16, 1976

[54] HIGH TOUGHNESS SYNTHETIC HIGH POLYMERS FOR SOFT CONTACT LENSES AND A PROCESS FOR MANUFACTURING THE SAME

[75] Inventor: Kyoichi Tanaka, Nagoya, Japan

[73] Assignee: Toyo Contact Lens Company, Limited, Nagoya, Japan

[22] Filed: Mar. 17, 1975

[21] Appl. No.: 559,003

[30] Foreign Application Priority Data
Nov. 14, 1974 Japan .............................. 49-131264

[52] U.S. Cl. ....................................... 526/219; 3/13; 264/1; 264/328; 351/159; 526/218; 526/320
[51] Int. Cl.² ......................................... C08F 216/02
[58] Field of Search .................. 260/80.75; 526/320, 526/218, 219; 264/1, 328

[56] References Cited
UNITED STATES PATENTS

| | | | |
|---|---|---|---|
| 3,503,942 | 3/1970 | Seiderman | 260/80.75 |
| 3,813,447 | 5/1974 | Tanaka et al. | 260/80.75 |
| 3,880,818 | 4/1975 | Shen et al. | 260/80.75 |

*Primary Examiner*—Harry Wong, Jr.
*Attorney, Agent, or Firm*—Dennison, Dennison, Meserole & Pollack

[57] ABSTRACT

A process for manufacturing high toughness synthetic high polymers for soft contact lenses comprising the steps of: preparing a five-component solution by adding to a predominant two-components solution of a 2-hydroxyethyl methacrylate monomer and n-amyl methacrylate monomer a vinyl propionate monomer and a vinyl acetate monomer as auxiliary components with further addition of an initiator for polymerization, followed by mixing to provide an intimate mixture or solution; injecting the solution into a mold; preferably closing the mold during heating and copolymerizing of the solution in the mold; and cooling the product, followed by removal thereof from the mold. A synthetic high polymer manufactured according to the process of this invention is high in hydrophilicity, optical performance and machinability, which fulfills the requirements for manufacturing conventional soft contact lens. In addition the synthetic high polymer exhibits tenacious elasticity and, when hydrated and swollen, has no tendency to break or crack, thus being highly suitable as the material for soft contact lens with high durability. Moreover, the synthetic high polymer of this invention can be used for the manufacture of artificial corneas and optical lenses for medical use, and also, when dyed, for the manufacture of artificial eyes and iris contact lenses.

4 Claims, No Drawings

HIGH TOUGHNESS SYNTHETIC HIGH POLYMERS FOR SOFT CONTACT LENSES AND A PROCESS FOR MANUFACTURING THE SAME

This invention relates to synthetic high polymers for soft contact lenses and a process for manufacturing them.

Conventionally used materials for soft contact lenses mainly include homopolymers or copolymers of OH-bearing acrylic derivatives, copolymers of an OH-bearing acrylic derivative and vinylpyrrolidone and vinylpyrrolidone homopolymers. The soft contact lenses made of these materials are satisfactory in optical performance as lenses and due to swelling upon hydration, are not painful in use. In addition, good machinability of these materials permits the manufacture of a precisely shaped thin contact lens. Although having excellent properties as set forth above, the soft contact lenses made of conventional materials have still suffered from the drawback of having a tendency to break or crack while handling them, because they are brittle and of low mechanical strength. This drawback becomes more marked when they are swollen with water. They are broken very often in handling during placement in contact with, or removal from contact with, the eyeballs. Since a contact lens is handled as a lens and directly fits on the eye it is necessary to sterilize it such as by treatment in boiling water, followed by removing deposits on the surface of the lens by rubbing the lens surface directly with a soft sponge or a finger tip. In such cleaning and sterilizing operations the soft contact lenses made of the above described conventional materials show a tendency to break or crack, and are therefore not suitable for prolonged use.

It is, therefore, an object of this invention to provide a synthetic high polymer for soft contact lenses having a novel composition wherein the above mentioned drawbacks of the contact lenses known in the art are eliminated, and to provide a process for manufacturing such synthetic high polymers.

It is another object of this invention to provide soft contact lenses manufactured from such synthetic high polymers.

It is still another object of this invention to provide additional uses for such synthetic high polymers.

The synthetic high polymer according to the present invention is manufactured by a process comprising mixture 80 to 92 parts by weight of a 2-hydroxyethyl methacrylate monomer with 12 to 5 parts by weight of a n-amyl methacrylate monomer, adding to the principal components 5 to 2 parts by weight of a vinyl propionate monomer and 3 to 1 part(s) by weight of a vinyl acetate monomer as auxiliary components and heating and copolymerizing the mixture after addition thereto of 0.02 to 0.20 part by weight of $\alpha,\alpha'$-azobisisobutyronitrile or 2, 2'-azobis-2,4-dimethyl-valeronitrile as an initiator for polymerization.

The synthetic high polymer thus produced is transparent and high in hydrophilicity, and thus has an appropriate water-absorption property and flexibility. In addition, it is tenacious and resistant to physical tension or force, thereby showing little tendency to break, or crack. What is specially noteworthy is that it retains its excellent toughness and tensile strength even after it has been swollen with water or an aqueous solution (e.g. 0.9% aqueous saline solution) and softened. Due to its good machinability the synthetic high polymer can be machined, easily and precisely, into a contact lens using any conventional machining device for forming contact lenses. The soft contact lens is difficult to break even if it is a thin one and has good memory characteristics at temperatures above 30° C and a stable curved surface as well as good optical performance. In addition to the use of such synthetic high polymers for the manufacture of soft contact lenses, they are suitable also for the manufacture of artificial corneas and optical lenses for medical use, for example, gonioscopes for the examination of the eyes. Since such synthetic high polymers can be dyed easily in the course of their manufacture, artificial eyes and iris contact lenses can readily be produced from the dyed synthetic high polymers.

The present invention will now be further illustrated by the following non-limitative examples:

EXAMPLE 1

A solution was prepared by mixing 10 parts by weight of a n-amyl methacrylate monomer with 85 parts by weight of 2-hydroxyethyl methacrylate monomer. 2 parts by weight of a vinyl propionate monomer and 3 parts by weight of a vinyl acetate monomer were added to and thoroughly mixed with the solution. 0.1 part by weight of $\alpha,\alpha'$-azobisisobutyronitrile was then added as an initiator for polymerization. Thereafter a container with the five-components was placed in an ultrasonic agitator device to effect thorough mixing and dissolution of the components, and then the mixture or solution was injected into a mold. The molds used in this invention may be made of any materials from which the synthetic high polymers of the invention can be released easily, for example, polyethylene, polypropylene or metals, and of a configuration conforming to the selected shape of the synthetic high polymers which shape permits easy machining into contact lenses, for example, rod- or plate-like shape. In this example a tubular mold made of polyethylene and measuring 16 mm in inner diameter 180 mm in depth was used.

The mold, into which the solution had been injected, was sealed by closing it with a stopper, and heated under the following heating conditions for the stated periods of time to effect polymerization of the solution. Thus the mold into which the solution had been injected was placed in a water bath, and the temperature of the water bath held at 40° C for 16 hours, then at 60° C for 4 hours, then at 80° C for 3 hours and finally at 100° C for 2 hours to effect thorough heating and copolymerization of the solution within the mold. After the reaction the solution was cooled down to room temperature, and then could be removed easily from the mold in the form of a solid synthetic high polymer. The resulting rod-shaped synthetic high polymer was found transparent and highly hydrophilic, exhibiting at the same time good elasticity and toughness when hydrated. The product was used as the material for manufacturing a contact lens. It was cut on a conventional machining tool into a disk having a thickness of 5 mm, which disk in turn was machined into the shape of a contact lens to provide a high toughness soft contact lens. The physical properties of the contact lens made of the above material are as set forth in the following Table I.

Table I

Physical Properties of the Synthetic High Polymer produced in Example 1

| Properties Measured | Parameters of, and Unit of Measurement | | Values for High Polymer of Example 1 | Prior Art High Polymer |
|---|---|---|---|---|
| Water absorption | 20° C ± 1° C | Wt% | 29.00 | 34.6 |
| Coefficient for linear expansion | 20° C ± 1° C | — | 1.137 | 16.7 |
| Rubber hardness | 19° C ± 1° C | — | 32.1 | 31.5 |
| Refractive Index | 20° C ± 1° C | $Nd^{20}$ | 1.4577 | 1.445 |
| Specific gravity | 20° C ± 1° C | — | 1.164 | 1.14 |
| Heat resistance | Boiling | — | Resistant | Resistant |
| Freezing stability | −4° C ∼−6° C | — | No change | No change |
| Tensile strength | 20° C | g/mm | 913 | 413 |
| Transmission of oxygen | Room temperature $\frac{cc \cdot cm}{cm^2 \cdot sec \cdot mg}$ | | $0.585 \times 10^{-10}$ | $0.50 \times 10^{-10}$ |
| Transmission of visible rays | Room temperature % | | 90 | 90 |

Note:
The prior art soft contact lens was the one made of a polymer of 2-hydroxyethyl methacrylate.

In the following will be described the way of measurement for some items in Table I:
a machined contact lens measuring 10 mm in diameter and 0.15 mm in depth was soaked in a 0.9% saline solution, and after the contact lens was swollen with an excess of water to an equilibrium state prior to use as a test piece.

Heat resistance: The test piece was soaked in water, and boiled therein over a long period of time, followed by visual inspection of its condition by forming an enlarged image of the piece by use of a projector.

Freezing stability: The test piece was soaked in water then frozen at −4° to −6° C, and then the water allowed to melt at room temperature and the condition of the test piece after the melting of the water visually inspected by forming an enlarged image of the piece by use of a projector.

Tensile strength: The test piece was placed on a barrel-shaped pedestal of a tensile strength tester, the peripheral portion of which piece was fixed to the pedestal to prevent movement of the piece. Thereafter, one tip of a round-tipped pressing needle measuring 1 mm in diameter was put on the center of the test piece, and a load applied to the other end of the needle to press the test piece. The load (g/mm) at which the test piece broke was taken as the tensile strength value.

Transmission of oxygen: This was measured with the test piece on a "Kaken" type Oxygen-Transmission-Through-Film Tester (maufactured by Rika Seiki Kogyo Kabushiki Kaisha).

Transmission of visible rays: A 20 mm × 30 mm × 0.20 mm film was made and measured for transmission of visible rays (380 to 700 mµ) on a photometer (made by Shimazu Seisakusho).

Table II sets forth the results of the durability test made with the soft contact lens made of the synthetic high polymer of Example 1.

Table II

Results of Durability Test made with Soft Contact Lens made of Synthetic High Polymer of Example 1

| | The number of times cleaned | | | |
|---|---|---|---|---|
| | 2000 | 4000 | 6000 | 8000 |
| | Boiling time in hours | | | |
| | 64 | 128 | 192 | 256 |
| Properties Measured | | | | |
| Change in appearance | None | None | None | None |
| Turbidity | None | None | None | None |
| Coloration | None | None | None | None |

Table II-continued

Results of Durability Test made with Soft Contact Lens made of Synthetic High Polymer of Example 1

| | The number of times cleaned | | | |
|---|---|---|---|---|
| | 2000 | 4000 | 6000 | 8000 |
| | Boiling time in hours | | | |
| | 64 | 128 | 192 | 256 |
| Properties Measured | | | | |
| Change in shape | None | None | None | None |

This test was carried out by repeating the operation involving boiling a test piece in water, taking it out therefrom and washing it. This test was made so as to estimate the durability of the contact lens in normal use. The test results were obtained by observing the test piece by forming an enlarged image thereof by use of a projector.

EXAMPLE 2

A solution was prepared by mixing 15 parts by weight of a n-amyl methacrylate monomer with 80 parts by weight of 2-hydroxyethyl methacrylate monomer. 3 parts by weight of vinyl propionate and 2 parts by weight of vinyl acetate were added to and mixed with the solution, and then 0.1 part by weight of $\alpha,\alpha'$-azobisisobutyronitrile was added as an initiator for polymerization to prepare a solution consisting of the five components. In stirring the solution to achieve thorough mixing and dissolution of the components, it is necessary to remove from the solution bubbles formed during the stirring operation. The five-component solution was injected into a tubular mold. The mold was then sealed by closing it with a stopper and placed in a water bath. The solution within the mold was heated in four stages to effect polymerization thereof by holding the bath temperatire at 40° C for 16 hours, then at 60° C for 3 hours, then at 80° C for 4 hours and finally at 100° C for 2 hours. When the the reaction product was cooled down to room temperature, it could be removed from the mold in the form of a solid synthetic high polymer. The synthetic high polymer was found to be transparent and hydrophilic, exhibiting at the same time high toughness. This synthetic high polymer could easily be formed, by a conventional machining process for the manufacture of contact lenses, into the shape of a contact lens. The soft contact lens thus obtained, when soaked in an aqueous solution and thereby swollen and softened, was transparent, exhibiting at the same time moderate elasticity, high toughness and a very high tensile strength. (See Table III.)

EXAMPLE 3

5 parts by weight of n-amyl methacrylate were dissolved in 90 parts by weight of 2-hydroxyethyl methacrylate. Thereafter 2.5 parts by weight of vinyl propionate and 2.5 parts by weight of vinyl acetate were added to and dissolved in the solution. Then, 0.1 part of by weight of 2,2'--azobis-2,4-dimethylvaleronitrile as an initiator for polymerization was mixed with and dissolved in this solution. The resultant five-component solution was injected into a tubular mold. The mold was then sealed by closing it with a stopper and heated in four stages in analogous manner as in Example 1 or 2 to effect polymerization of the solution. In this way the solution was co-polymerized to provide a synthetic high polymer. This synthetic high polymer was found to be transparent and hydrophilic, and when soaked in and aqueous solution and thereby swollen and softened, retained considerable toughness. Its tensile strength was higher than that of a prior art material. (See Table III.)

EXAMPLE 4

8 parts by weight of a n-amyl methacrylate monomer were dissolved in 87 parts by weight of a 2-hydroxyethyl methacrylate monomer. Then, 2 parts by weight of a vinyl propionate monomer and 3 parts by weight of a vinyl acetate monomer were added to prepare a solution consisting of the four components. To this solution was added 0.2 part by weight of 2,2'-azobis-2,4-dimethylvaleronitrile as an initiator for polymerization and the mixture was allowed to stand for some time at room temperature to dissolve the initiator in the solution. The resultant five-component solution was then injected into a tubular mold as in the Examples above and the mold was closed and sealed by fitting a stopper into the injection hole. Thereafter the mold was placed in a water bath and the solution was heated in four stages under the same conditions as in Exaple 1 to effect co-polymerization. In this way the solution was co-polymerized to provide a synthetic high polymer.

The synthetic high polymer thus obtained was found to be transparent and highly hydrophilic, and easily swollen and softened upon hydration. The tensile strength of this synthetic high polymer was found to be two times or more greater than that of a prior art hydrogel. (See Table III.)

The tensile strength of soft contact lenses obtained by the above described Examples is set forth in the following Table III.

Table III

Comparison of Tensile Strength between Contact Lenses made of Different Synthetic High Polymers

|  | Tensile strength, g/mm |
|---|---|
| Contact lens made of synthetic high polymer of Example 1 | 913 |
| Contact lens made of synthetic high polymer of Example 2 | 1518 |
| Contact lens made of synthetic high polymer of Example 3 | 720 |
| Contact lens made of synthetic high polymer of Example 4 | 1053 |
| Prior art soft contact lens | 430 |

The tensile strength was measured in accordance with the manner described above. The prior art soft contact lens was the one made of a polymer of 2-hydroxyethyl methacrylate as used above. As can be seen from Table III the soft contact lens obtained in accordance with the present invention is superior in tensile strength to the prior art soft contact lens.

In the present invention, the proportions of the respective components providing satisfactory synthetic high polymers are as follows.

| Proportion of the main components: | |
|---|---|
| 2-hydroxyethylmethacrylate monomer | 80 to 92 parts by weight; |
| n-amyl methacrylate monomer | 12 to 5 parts by weight |
| Proportion of the auxiliary components: | |
| Vinyl propionate monomer | 5 to 2 parts by weight; |
| Vinyl acetate monomer | 3 to 1 part(s) by weight |
| Proportion of an initiator for polymerization: | |
| α, α'-azobisbutyronitrile | 0.02 to 0.20 part by weight; |
| 2, 2'-azobis-2, 4-dimethyl-valeronitrile | 0.02 to 0.20 part by weight |

The following is a discussion of the relationship between the proportions of the components and the properties of the resultant synthetic high polymers.

If more than 12 parts by weight of a n-amyl methacrylate monomer per 80 parts by weight of a 2-hydroxyethyl methacrylate monomer is used, then the resultant synthetic high polymer will be degraded in the properties of elasticity and water absorption as well as memory retention upon soaking the synthetic high polymer in an aqueous solution. As specified above the proper vinyl propionate monomer-to-vinyl acetate monomer ratio is in the range of 5-2 parts by weight of the former to 3-1 part(s) by weight of the latter, in which range the resultant synthetic high polymer exhibits excellent transparency. In addition, if the sum of a vinyl propionate monomer and a vinyl acetate monomer exceeds 8 parts by weight to the stated proportion of the main components, then the resultant synthetic high polymer will become turbid and opaque, which results in reducing its suitability as lens material.

When, in the formulation consisting of 92 parts by weight of a 2-hydroxyethyl methacrylate, 5 parts by weight of a n-amyl methacrylate monomer, 2 parts by weight of a vinyl propionate monomer, 1 part by weight of a vinyl acetate monomer and 0.1 part by weight of α,α'-azobisisobutyronitrile, the proportion of the n-amyl methacrylate monomer was lessened, the resultant synthetic high polymer produced lost elasticity and physical strength upon hydration by soaking the polymer in an aqueous solution. In addition, as regards the ratio of the auxiliary components, i.e. the vinyl propionate monomer-to-vinyl acetate monomer ratio, synthetic high polymers with good flexibility were obtained when the ratio was in the range of from 2:1 to 5:3, based on parts by weight. When the sum of a vinyl propionate monomer and a vinyl acetate monomer was less than 3 parts by weight, the resultant synthetic high polymer was lessened in flexibility and the stability and shape-memory characteristics of a contact lens formed therefrom were degraded.

What is claimed is:

1. A process for the manufacture of high toughness synthetic high polymers for soft contact lenses, comprising the steps of:
    preparing a prepolymerization mixture by adding about 12 to 5 parts by weight of an n-amyl methacrylate monomer to about 80 to 92 parts by weight of a 2-hydroxyethyl methacrylate monomer, then adding about 5 to 2 parts by weight of a vinyl propionate monomer and about 3 to 1 part by weight of a vinyl acetate monomer followed by the addition of about 0.02 to 0.20 part by weight of an initiator for polymerization;
    injecting said mixture into a mold;
    heating said mixture from the outside of said mold, while maintaining the mold closed, consecutively at about 40° C for about 16 hours, then at about 60° C for about 4 hours, then at about 80° C for about 3 hours and then at about 100° C for about 2 hours to thereby effect copolymerization of said components;
    cooling the product of said copolymerization from the outside of said mold; and
    releasing said product from said mold.

2. The process as defined in claim 1 wherein about 0.02 to 0.20 part by weight of $\alpha,\alpha'$-azobisisobutyronitrile is used as said initiator for polymerization.

3. The process as defined in claim 1 wherein about 0.02 to 0.20 part by weight of 2,2'-azobis-2,4-dimethylvaleronitrile is used as said initiator for polymerization.

4. A high toughness synthetic high polymer for soft contact lenses manufactured by the process as defined in claim 1.

* * * * *